May 18, 1926.
L. HÖROLD
ROLLER GUIDE FOR SAW FRAMES FOR HORIZONTAL AND
VERTICAL MULTIPLE BLADE SAW FRAMES
Filed April 28, 1924
1,585,543
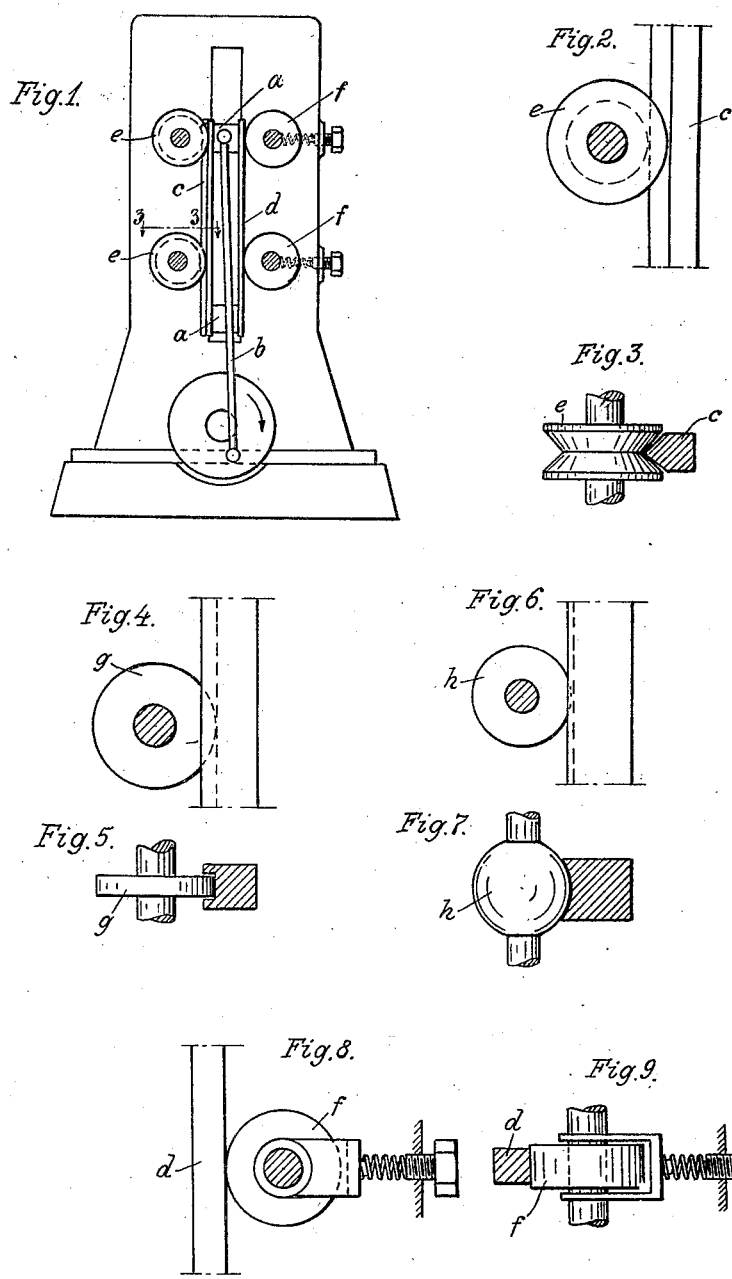

Patented May 18, 1926.

1,585,543

UNITED STATES PATENT OFFICE.

LUDWIG HÖROLD, OF WIESBADEN, GERMANY.

ROLLER GUIDE FOR SAW FRAMES FOR HORIZONTAL AND VERTICAL MULTIPLE-BLADE SAW FRAMES.

Application filed April 28, 1924. Serial No. 709,592.

Frame guidings for saw frames, such as multiple blade saw frames, in which the slide blocks of the saw frame are constructed like ball- or roller bearings, have become known. The saw frame is guided by rollers, mounted in the ends of the saw frame cross bars, between guide bars of the machine frame, a separate guide being generally provided for each frame cross bar. The wood particles and saw dust which fly about at the sawing, settle on these guide bars, which are of course accommodated in the free space of the machine or in slits in the sides of the machine frame. The wood particles settle preferably on the greasy guide bars of the saw frame where they are liable to produce serious disorders. In order to enable the saw frames with guide rollers to be guided so that they can slide between stationary guide bars the diameter of the guide rollers must be somewhat shorter than the linear distance between the guide bars. It must not be overlooked that the cross section of the passage between the guide bars is reduced by the wood particles and saw dust settling on the guide bars. The result is that at the reversal of stroke, particularly owing to the high number of revolutions of the machine, strong shocks occur from which the frame guides and the whole machine suffer seriously.

On the other hand it has already been proposed to guide the fixing bar for each saw blade of pendulum saws between stationary rollers of the machine frame, a separate guide with two pairs of rollers being arranged at the end of each saw blade.

This invention has for its object to use this latter arrangement considerably simplified for the guiding of the saw blades of multiple blade saw frames in order to avoid the above stated inconveniences of the commonly used roller guides. With this object in view the frame cross bars are joined by means of side bars to form a frame which is guided between two pairs of stationary rollers fixed in the machine frame. This arrangement makes it unnecessary to provide special supporting columns between the frame cross bars, said supporting columns being replaced by the side bars which require only one guide at each side.

According to the invention the guide frame can be arranged on the outer side of the machine frame where it is better protected against the wood particles flying about at the sawing. This arrangement facilitates further the observation of the frame guide which is so important for multiple blade saw frames. According to the invention the contact surface of one of the side bars is bevelled, that of the other guide bar being smooth whereby a secure guiding on the bevelled faces is ensured and the putting together of the guide bars and rollers is facilitated as on the plane side no adjusting work is required. The guide rollers on one side, preferably those on the plane side, are resiliently mounted in order to compensate for the narrowing of the free cross section of the passage between the pairs of rollers due to the settling of wood particles on the guide faces.

An embodiment of the invention is shown by way of example on the accompanying drawing, in which:—

Fig. 1 shows diagrammatically in side elevation a vertical multiple saw blade frame.

Fig. 2 shows in side elevation, and

Fig. 3 in section on enlarged scale on the line 3—3 Fig. 1 the grooved roller and bevelled guide bar.

Fig. 4 shows in elevation, and

Fig. 5 in plan view another form of construction of the guide roller and guide bar.

Fig. 6 shows in elevation, and

Fig. 7 in plan view a ball-shaped guide roller and the corresponding guide bar.

Fig. 8 shows in elevation, and

Fig. 9 in plan view the resilient mounting of a guide roller.

The cross bars $a$ of the saw frame are connected with one another at their ends by guide bars $c$ and $d$ to form a frame which, by means of crank rods $b$ which act as usual on both sides of the ends of the frame, is moved up and down. The guide rails $c$ and $d$ slide upon two pairs of rollers $e$ and $f$. In order to ensure a good guiding of the sides of the saw frame the rollers $e$ are constructed like grooved rollers and the guide bar $c$ as a bevelled bar as shown in Fig. 1. The rollers $f$ however and the guide bar $d$ have plane guide faces whereby much adjusting work is saved. As shown in Figs. 1, 8 and 9 a strong spring pressure is exerted on the rollers $f$. When the free cross section of the passage is reduced by wood particles collecting on the guide elements these rollers yield so that breakage is prevented. Figs. 2 and 3 show on enlarged scale the grooved roller *e* and the bevelled guide bar *c* in side elevation and plan view respectively. Another form of construction of the guide rollers is shown in Figs. 4 and 5 in elevation and plan view respectively, the guide roller *g* is smooth and the guide bar *c* has a guide groove. As shown in Figs. 6 and 7 in elevation and plan view the guide rollers may consist each of a ball *h* on which the concave side edge of the guide bar moves. In this form of construction the friction produced can be reduced to the minimum when the radius of the concavity of the guide bar is slightly greater than the radius of the ball.

The saw frame guide can be arranged as shown in Fig. 1 on the outer side of the machine frame whereby, besides a better observation and easier accessibility, the great advantage is obtained that the frame guide is better protected against the wood particles which fly about than if it were arranged on the inner surface of the machine frame or in this inner surface.

I claim:—

1. Roller guidings for saw frames for horizontal and vertical multiple blade saw frames comprising in combination with the machine frame and with the cross bars of the saw frame, two side bars one at each end of the cross bars for connecting the cross bars to form a guide frame, and two pairs of stationary guide rollers fixed on the machine frame one pair at each side of the guide frame and designed to guide said guide frame.

2. Roller guidings for saw frames for horizontal and vertical multiple blade saw frames comprising in combination with the machine frame and with the cross bars of the saw frame, two side bars one at each end of the cross bars for connecting the cross bars to form a guide frame, and two pairs of guide rollers having bearings on the outer sides of the machine frame one pair at each side of the guide frame and designed to guide said guide frame so that the guide faces are well protected from wood particles flying about.

3. Roller guidings for saw frames for horizontal and verticle multiple blade saw frames comprising in combination with the machine frame and with the cross bars of the saw frame, two side bars one at each end of the cross bars for connecting the cross bars to form a guide frame, one of said guide bars being bevelled, and two pairs of guide rollers having bearings on the outer sides of the machine frame one pair at each side of the guide frame and designed to guide said guide frame so that the guide faces are well protected from wood particles flying about, the pair of guide rollers for the side bar of prismatic cross section being grooved to guide said side bar.

In testimony whereof I affix my signature.

LUDWIG HÖROLD.